United States Patent
Dautartas

[19]

[11] Patent Number: 6,136,411
[45] Date of Patent: Oct. 24, 2000

[54] ANGULARLY SELF-ALIGNED OPTICAL SUBASSEMBLY

[75] Inventor: Mindaugas Fernand Dautartas, Alburtis, Pa.

[73] Assignee: Lucent Technologies, Inc., Murray Hill, N.J.

[21] Appl. No.: 09/363,533

[22] Filed: Jul. 29, 1999

[51] Int. Cl.[7] .................................................. B32B 17/00
[52] U.S. Cl. .......................... 428/141; 428/143; 428/172; 428/173; 385/17; 385/76; 385/89; 385/90
[58] Field of Search .................................... 428/141, 143, 428/172, 173; 385/17, 76, 89, 90

[56] References Cited

U.S. PATENT DOCUMENTS 4,945,400  7/1990  Blonder .
5,113,404  5/1992  Gaebe .

*Primary Examiner*—Timothy M. Speer
*Attorney, Agent, or Firm*—Wendy W. Koba

[57] ABSTRACT

A silicon optical bench arrangement is used to provide for proper angular orientation between various components of an optical subassembly. A set of "optical stops" comprising alignment spheres held in pyramidal detents are formed in predetermined locations across the surface of an optical substrate. The separate optical components are positioned adjacent to the optical stops and subsequently held in place by bonding or other attachment means. By properly positioning the optical stops with respect to one another, any desired orientation between the optical components can be achieved.

9 Claims, 2 Drawing Sheets

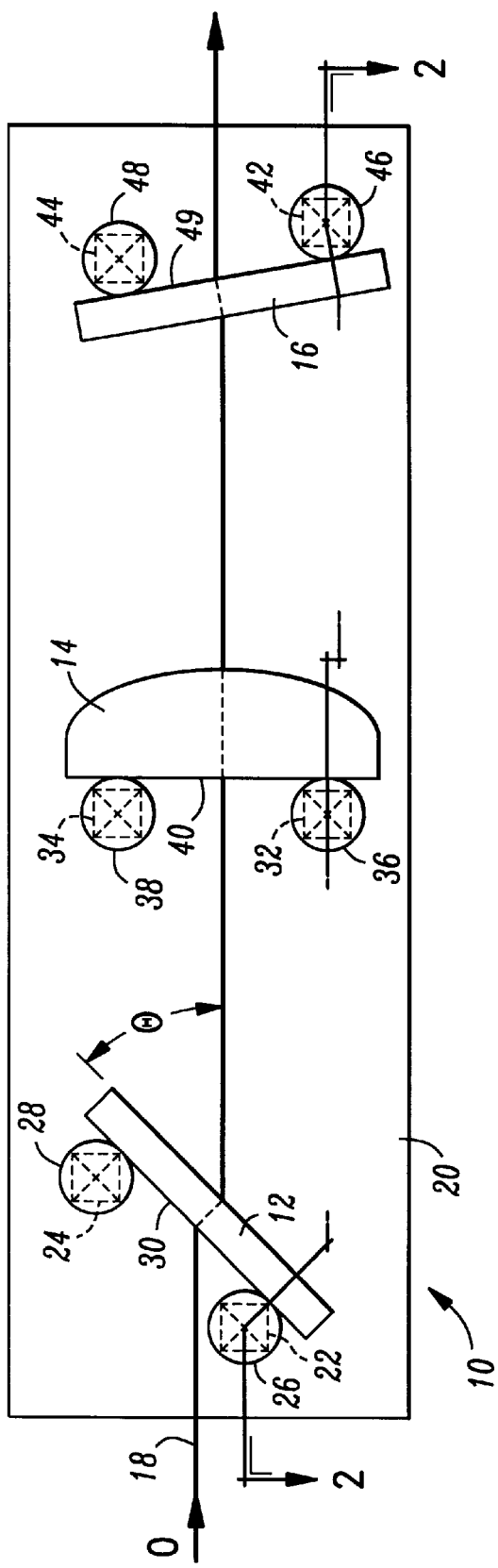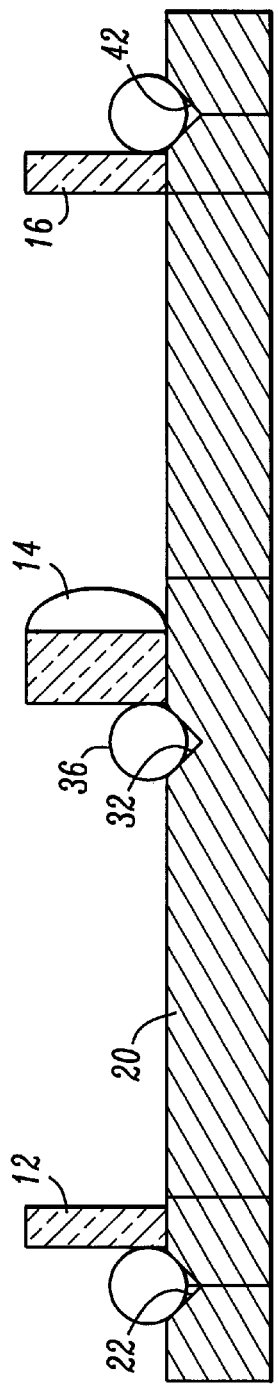

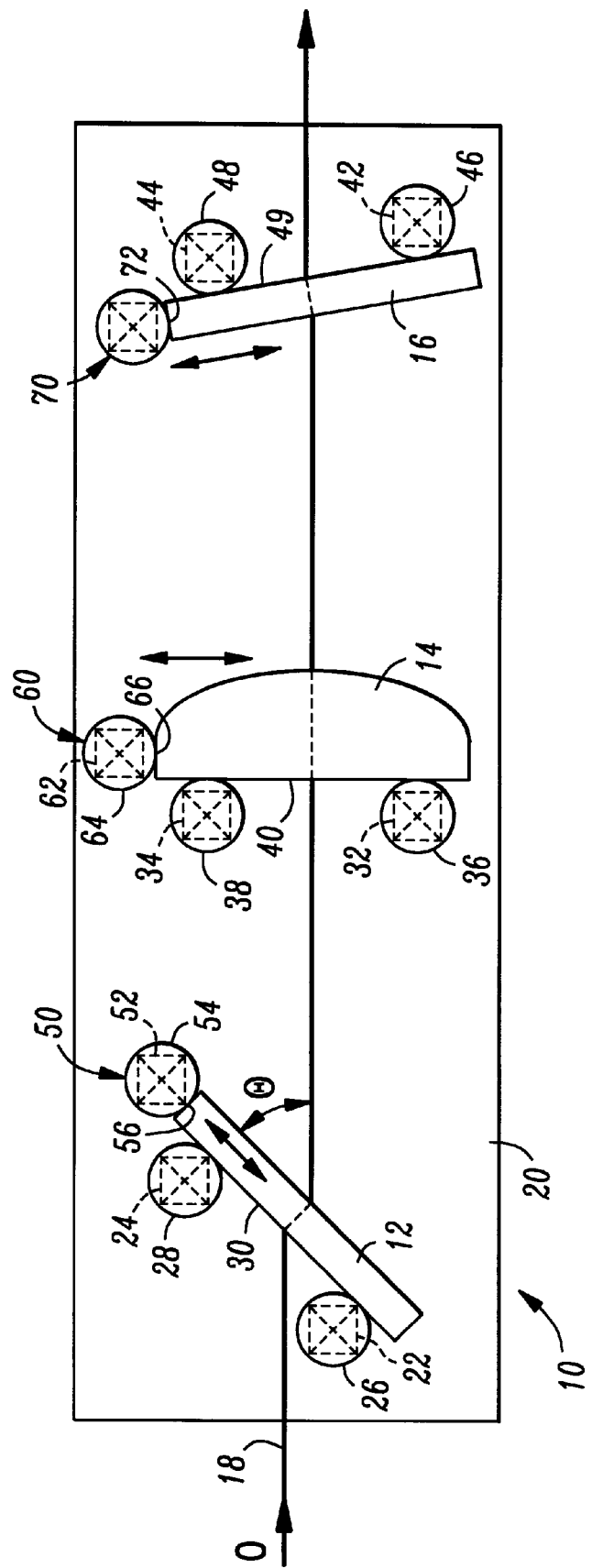

ANGULARLY SELF-ALIGNED OPTICAL SUBASSEMBLY

TECHNICAL FIELD

The present invention relates to an optical subassembly and, more particularly, to the utilization of accurately positioned spheres on the surface of a silicon substrate to, provide any desired angular displacement between optical components supported by the substrate.

DESCRIPTION OF THE PRIOR ART

In the realm of optical device packaging there has developed a body of knowledge over the past several years regarding "silicon optical bench" (SiOB) technology. The SiOB technology has been found to simplify many optical packaging arrangements and, in some instances, has provided optical "self-alignment" between the various piece parts forming an optical subassembly (such as between, for example, an optical transmitting device, lens and communication fiber). An exemplary utilization of silicon in the formation of an optical subassembly can be found in U.S. Pat. No. 4,945,400 issued to G. E. Blonder et al. on Jul. 31, 1990 and assigned to the assignee of record in this application. In general, Blonder et al. disclose a subassembly including a variety of etched features (e.g., grooves, cavities, alignment detents) and metallization patterns (e.g., contact, reflectors) which enable the optoelectronic device to be reliably and inexpensively mounted on the base and coupled to a communicating optical fiber.

Although the Blonder et al. subassembly represents a significant advance in the field of silicon optical bench packaging, many current optical subsystems are used in a variety of diverse applications requiring additional components in the form of gratings, filters, isolators, and the like. It is well-known that for a number of specific applications (such as, for example, DWDM) the subassembly is capable of operating at different wavelengths, usually as a function of the angular orientation of the various optical components to one another. Heretofore, the inter-component angular positioning required active alignment, usually with a technician (or computer-controlled arrangement) physically moving one piece part with respect to another until the proper angular orientation was achieved.

A need remains, therefore, for providing the self-aligning benefits of silicon optical bench technology in subassemblies where angular orientation between components is an issue.

SUMMARY OF THE INVENTION

The need remaining in the prior art is addressed by the present invention, which relates to the utilization of accurately positioned spheres on the surface of a silicon substrate to provide any desired angular displacement between optical components supported by the substrate.

In accordance with the present invention, pyramidal detents are etched in predetermined locations on the surface of a silicon substrate. A spherical alignment element is positioned within and subsequently attached to each pyramidal detent. The various optical elements forming the subassembly are then positioned on the substrate surface such that the spheres function as mechanical "stops" for the elements. Angular orientation can thus be achieved by disposing a pair of pyramidal detents at a predetermined angle with respect to one another. A flat surface of an optical element, such as a grating or filter, when positioned against the spheres held within these detents will therefore be positioned at the same angle.

It is an advantage of the present invention that standard photolithographic techniques can be used to etch the pyramidal detents in the silicon material with an accuracy on the order of approximately one micron, or better. Such precision ensures proper placement and angular orientation of the optical elements. Further, the alignment spheres that are used as the physical "stops" also exhibit a tolerance on the order of one micron or better, further ensuring that the optical element will be positioned in precisely the desired location. Thus, the combination of the pyramidal detent accuracy and the precision tolerance of the spheres results in being able to provide an angular accuracy on the order of 3° for a 1mm sphere-to-sphere spacing. Obviously, any reduction in sphere spacing provides for an even greater accuracy in angular orientation, approaching (for example) accuracy on the order of one minute.

In one embodiment of the present invention, translational movement of an optical element may be prevented by disposing an "optical stop" (an "optical stop" for the purposes of the present invention being defined as consisting of a pyramidal detent and sphere) at an endface of the optical element.

Various and other embodiments of the present invention will become apparent during the course of the following discussion and by reference to the accompanying drawings.

BRIEF DESCRIPTION OF THE DRAWINGS

Referring now to the drawings, where like numerals represent like parts in several views, FIG. 1 is a top view of an exemplary optical subassembly using a set of three "optical stops" of the present invention to provide the desired angular orientation between adjacent optical components;

FIG. 2 is a cut-away side view of the arrangement of FIG. 1;

FIG. 3 is a top view of an alternative embodiment of the present invention, illustrating the utilization of translational optical stops.

DETAILED DESCRIPTION

An exemplary optical subassembly 10, utilizing the "optical stops" of the present invention, is illustrated in FIG. 1. Subassembly 10 includes a set of three optical elements 12, 14 and 16, that are to be angularly oriented with respect to one another as shown. For the purposes of the present invention, the specific type of component is of no concern, as long as each component includes one "flat" that may be used as the surface which rests against the optical stop. As shown, an input optical signal 0 propagates along a waveguide 18 of substrate 20 and first passes through optical element 12. Optical element 12 may comprise, for example, a filter that needs to be oriented at a particular angle $\theta$ so that only a select wavelength (or set of wavelengths) will pass through.

In accordance with the present invention, the angular placement of optical element 12 with respect to waveguide 18 is controlled by a pair of optical stops. Referring to FIG. 1, substrate 20 is formed to include a pair of pyramidal detents 22 and 24, where detents 22 and 24 are disposed so as to create the desired angle $\theta$ with respect to the waveguide. Pyramidal detents 22,24 may be formed in substrate 20 using any well-known etching technique. For example, an isotropic etch of, for example, KOH or EDP in <110> silicon will yield the desired pyramidal detent structure. Other etchants are possible and all are considered to fall within the spirit and scope of the present invention. Advantageously, the use of standard photolithographic techniques allows for the precise location of detents 22,24 to be controlled within a one micron (or better), tolerance. FIG. 2 contains a cut-away side view of the subassembly of FIG. 1, illustrating in particular etched detent 22.

Once the properly located detents are formed, a pair of spherical members are then located in and attached to each detent. Referring to FIGS. 1 and 2, a pair of spherical members 26, 28 are shown as disposed within pyramidal detents 22,24, respectively. Spheres 26,28 may be bonded to their associated detents using any well-known material, such as AlO bonding or epoxy bonding. Sapphire spheres may be formed with a precision on the order of one micron (or better), where such precision, coupled with the capability to accurately position and etch the pyramidal detents, allows for the optical elements to be positioned with respect to one another with micron tolerance levels. Once the spheres are attached to the detents, optical element 12 may be brought into contact with the spheres. Referring to FIG. 1, flat surface 30 of optical element 12 is shown as being in contact with spheres 26 and 28. Again, any suitable bonding agent may be used to permanently attach optical element 12 to spheres 26 and 28. In accordance with the present invention, therefore, optical element 12 will exhibit the same angular orientation θ as associated with detents 22 and 24. Therefore, optical element 12 will be "self-aligned" in position against the "optical stops" formed by spheres 26 and 28. Advantageously, since the pyramidal detents can be etched with an accuracy on the order of one micron (or less) and the alignment spheres (for example, sapphire spheres) can be formed with a tolerance on the order of one micron, the "optical stops" of the present invention, the angular orientation θ can be formed with a tolerance on the order of three minutes (or less).

In a similar fashion, optical element 14 may be properly positioned by using a pair of optical stops consisting of a pair of pyramidal detents 32 and 34, and associated spheres 36 and 38, where as discussed above spheres 36,38 are bonded in place within each associated detent. In this example, optical element 14 may comprise a GRIN lens, with flat surface 40 of element 14 positioned to contact spheres 36 and 38. In accordance with the present invention, the proper positioning of detents 32 and 34 with respect to detents 22,24 will result in optical element 14 being properly positioned with respect to optical element 12. That is, by first determining the angular relationship between the optical elements the detents can be etched into the silicon surface at appropriate locations so that this angular positioning is achieved.

Optical element 16 is similarly illustrated in FIGS. 1 and 2 as using a pair of optical stops of the present invention. As shown, a pair of pyramidal detents 42,44 are formed and used to support a pair of spheres 46 and 48, respectively. A flat surface 49 of optical element 16 can then be disposed against spheres 46 and 48 to provide for the desired alignment between optical elements 16 and 14.

As mentioned above, the "optical stops" of the present invention may also be used to prevent translation movement of the optical elements while at the same time providing the desired angular orientation of each element. FIG. 3 illustrates an alternative embodiment of the present invention, used to position the same three optical elements 12, 14 and 16. In this case, an additional optical stop 50 is used to prevent translational movement of optical element 12 with respect to the top surface of substrate 20 (as indicated by the arrows in FIG. 3). As with the optical stops described above, optical stop 50 comprises a pyramidal detent 52 formed in an appropriate location on substrate 20, with an alignment sphere 54 disposed within and bonded to detent 52. Referring to FIG. 3, optical stop 50 is located so as to physically contact end face 56 of optical element 12 so as to prevent the translational movement. The location of optical stop 50 vis-a-vis optical signal path 18 is determined a priori so as to ensure that the signal path passes through the desired portion of optical element 12. An optical stop 60 consisting of a pyramidal detent 62 and sphere 64 is disposed at an end surface 66 of optical element 14. With a stop in this position, element 14 is therefore prevented from translating out of the desired signal path. It is to be understood that a similar translational optical stop 70 may be disposed at an end surface 72 of optical element 16.

In most cases, each optical element will be permanently bonded to the spheres forming each optical stop. As such, there may be little or no opportunity for translation movement of the optical elements subsequent to bonding. The ability to use the optical stop arrangement of the present invention to form such translational barriers is considered to be a further assurance that movement will not occur and, more particularly, is useful in preventing such motion during the bonding process.

It is to be understood that the above-described embodiments of the present invention are exemplary only. For example, the silicon substrate may be substituted with a plastic material that is suitable molded utilizing either injection-molded or transfer-molded technologies. In some applications, particularly where cost is of a concern, plastic may be the material of choice. Various other means will be apparent to those skilled in the art and are considered to fall within the spirit and scope of the present invention as claimed below.

What is claimed is:

1. An optical subassembly comprising a plurality of optical elements to be disposed in a predetermined relationship to one another;

an optical substrate, including a top major surface, for supporting the plurality of optical elements; and a plurality of optical stops formed in the top major surface of said optical substrate, the plurality of optical stops disposed so as to provide for mechanical registration of the plurality of optical elements in the predetermined relationship on said optical substrate, each optical stop comprising a pyramidal detent formed in said top major surface of the optical substrate and an alignment sphere disposed within said detent, wherein an optical element may be disposed adjacent to and fixed to at least one optical stop to provide for the predetermined relationship.

2. An optical subassembly as defined in claim 1 wherein the optical substrate comprises silicon.

3. An optical subassembly as defined in claim 2 wherein the plurality of pyramidal detents comprise etched detents formed in the silicon substrate top major surface.

4. An optical subassembly as defined in claim 3 wherein the etched detents are formed to exhibit a positional, tolerance of approximately one micron or less.

5. An optical subassembly as defined in claim 2 wherein the plurality of alignment spheres comprise sapphire.

6. An optical subassembly as defined in claim 5 wherein the plurality of sapphire spheres are bonded to the associated plurality of etched pyramidal detents.

7. An optical subassembly as defined in claim 6 wherein AlO bonding is used to attach the plurality of sapphire alignment spheres to the plurality of etched pyramidal detents.

8. An optical subassembly as defined in claim 6 wherein epoxy bonding is used to attach the plurality of sapphire alignment spheres to the plurality of etched pyramidal detents.

9. An optical subassembly as defined in claim 1 wherein separate pairs of optical stops are associated with and used to position each optical element of the subassembly.

* * * * *